US010268769B2

(12) United States Patent
DeLuca et al.

(10) Patent No.: US 10,268,769 B2
(45) Date of Patent: Apr. 23, 2019

(54) SENTIMENT ANALYSIS

(71) Applicant: International Business Machines Corporation, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/250,115

(22) Filed: Aug. 29, 2016

(65) Prior Publication Data
US 2018/0060338 A1 Mar. 1, 2018

(51) Int. Cl.
*G06F 17/30* (2006.01)

(52) U.S. Cl.
CPC .................. *G06F 17/30867* (2013.01)

(58) Field of Classification Search
USPC ........................................................ 707/730
See application file for complete search history.

(56) References Cited

U.S. PATENT DOCUMENTS

| 7,555,523 | B1 * | 6/2009 | Hartmann | ............... H04L 51/12 709/206 |
| 8,356,025 | B2 | 1/2013 | Cai et al. | |
| 9,779,428 | B2 * | 10/2017 | Maddali | ............. G06Q 30/0282 |
| 2012/0036147 | A1 * | 2/2012 | Borst | ....................... H04L 51/12 707/769 |
| 2012/0151046 | A1 | 6/2012 | Weiss et al. | |
| 2012/0254063 | A1 * | 10/2012 | Ritterman | ............... G06Q 40/06 705/36 R |
| 2013/0124192 | A1 * | 5/2013 | Lindmark | ............. G06F 17/274 704/9 |
| 2014/0088944 | A1 * | 3/2014 | Natarajan | ............... G06Q 30/02 703/13 |
| 2014/0310191 | A1 | 10/2014 | Schobel | |
| 2015/0073774 | A1 * | 3/2015 | Becker | ................ G06F 17/2785 704/9 |

(Continued)

OTHER PUBLICATIONS

Bort J. "How this regular programmer became a 'Master Inventor' at IBM". Business Insider. Mar. 15, 2015. <http://businessinsider.com/inside-ibms-patent-creation-machine-2015-3>.

(Continued)

*Primary Examiner* — Hicham Skhoun
(74) *Attorney, Agent, or Firm* — Tihon Poltavets

(57) ABSTRACT

A method includes determining a first content is being accessed, wherein the first content includes a first message posted by a first user in a platform for communication between a plurality of users. The method initializes a sentiment filter for the first content based on a set of parameters. Responsive to identifying a first word, the method determines whether the first word of the first message exceeds a negative sentiment threshold. Responsive to determining the first word of the first message exceeds the negative sentiment threshold, the method identifies one or more parameters for displaying the first message posted by the first user, wherein the one or more parameters alter how the first word and the first message are displayed with respect to the exceeding of the negative threshold. The method displays the first message posted by the first user according to the identified one or more parameters.

18 Claims, 4 Drawing Sheets

(56) References Cited

U.S. PATENT DOCUMENTS

| | | | |
|---|---|---|---|
| 2015/0120302 A1 | 4/2015 | Mccandless et al. | |
| 2015/0242391 A1* | 8/2015 | Goel | G06F 17/2785 |
| | | | 704/9 |
| 2015/0249584 A1 | 9/2015 | Cherifi et al. | |
| 2015/0281208 A1 | 10/2015 | Lowe et al. | |
| 2015/0365366 A1* | 12/2015 | Prabhu | H04L 41/0604 |
| | | | 709/206 |
| 2016/0269342 A1* | 9/2016 | Bank | H04L 51/32 |
| 2017/0257329 A1* | 9/2017 | Tetreault | H04L 51/046 |

OTHER PUBLICATIONS

Nahar et al. "Sentiment Analysis for Effective Detection of Cyber Bullying". Web Technologies and Applications 14th Asia-Pacific Web Conference, APWeb 2012, Kunming, China, Apr. 11-13, 2012. Proceedings. vol. 7235 of the series Lecture Notes in Computer Science pp. 767-774. Copyright Springer-Verlag Berlin Heidelberg 2013.

"Method and System for Preventing Cyberbullying". An IP.com Prior Art Database Technical Disclosure. IP.Com Electronic Publication Date: Dec. 3, 2009. IP.com No. IPCOM000190517D.

"What is Cyberbullying". WayBack Machine <http://web.archive.org/web/20150820115941/http://www.stopbullying.gov/cyberbullying/what-is-it> Dated Aug. 20, 2015. stopbullying.gov Washington, DC.

* cited by examiner

SENTIMENT ANALYSIS

BACKGROUND

The present invention relates generally to filtering content and more particularly to filtering content on a webpage based on sentiment analysis.

Typically, news outlets provide written articles on a website, where a user has the ability to read an article on a webpage and take part in a discussion pertaining to a topic of the article. Additionally, social media websites and messaging based applications for mobile devices provide platforms for communication between multiple users, where communications remain private between the multiple users taking part in a conversation.

SUMMARY

Embodiments of the present invention include a method, computer program product and computer system for filtering content on a webpage based on sentiment analysis.

A computer-implemented method includes determining, by one or more processors, a first content is being accessed, wherein the first content includes a first message posted by a first user in a platform for communication between a plurality of users; initializing, by one or more processors, a sentiment filter for the first content based on a set of parameters; responsive to identifying a first word of the first message, determining, by one or more processors, whether the first word of the first message exceeds a negative sentiment threshold; responsive to determining the first word of the first message exceeds the negative sentiment threshold, identifying, by one or more processors, one or more parameters for displaying the first message posted by the first user, wherein the one or more parameters alter how the first word and the first message are displayed with respect to the exceeding of the negative threshold; and displaying, by one or more processors, the first message posted by the first user according to the identified one or more parameters.

DETAILED DESCRIPTION

Presently, with the ability to post comments anonymously without revealing a user's true identity, many users post negative comments in the discussion section that may not be appropriate to all viewers of the article. Furthermore, most negative comments can stray away from the topic of the article and create isolated discussions that do not pertain to the topic of the article. Administrative users exist to review and filter comments that are flagged as inappropriate by other users participating in the discussion but often the rate at which comments populate a discussion exceeds the rate at which the administrative user can review flagged comments for inappropriate language. Additionally, social media website include private pages, where administrative users do not have access to review and filter comments that are flagged as inappropriate in a timely manner.

Figure 1:
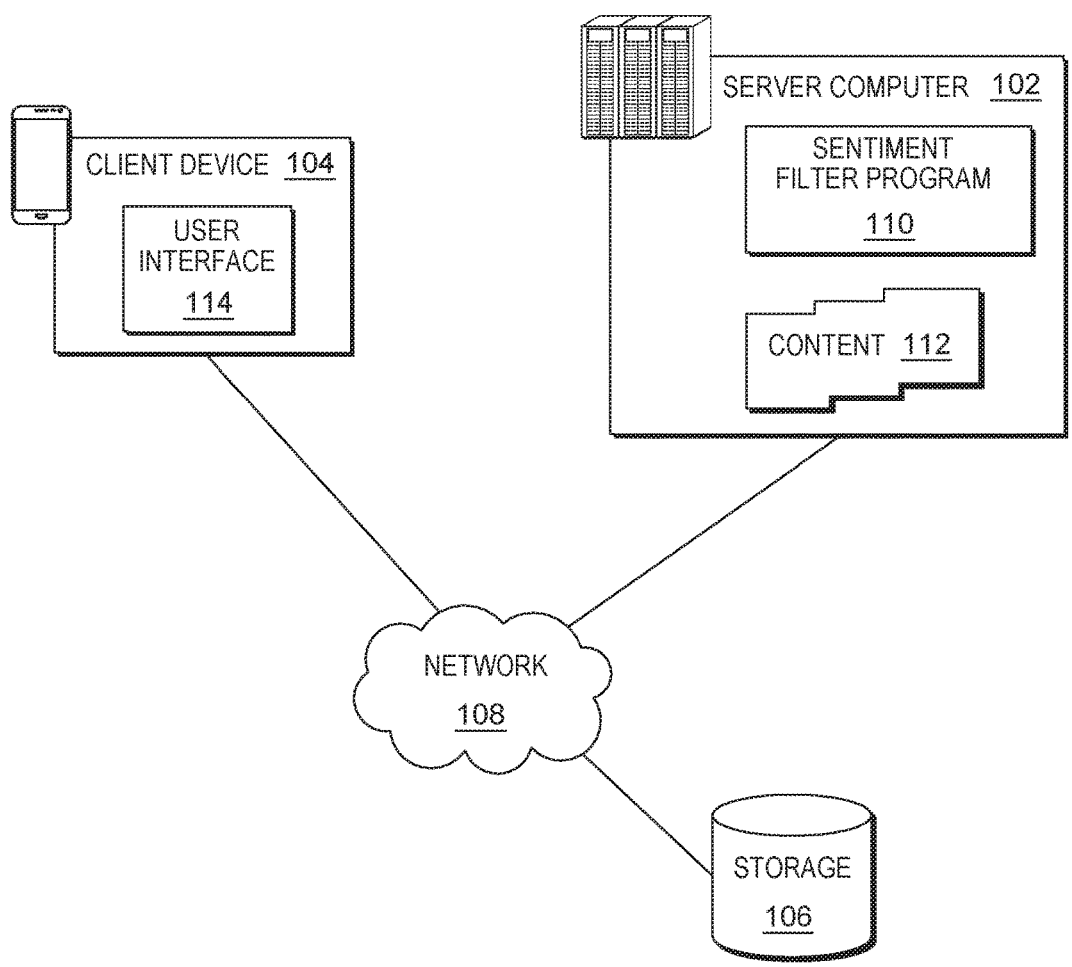
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment. The distributed data processing environment includes server computer 102, client device 104, and storage 106, all interconnected over network 108.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 includes sentiment filter program 110 and content 112 accessible by client device 104 and any other electronic devices not illustrated in FIG. 1, via network 108.

Client device 104 may be a laptop computer, tablet computer, netbook computer, personal computer (PC), personal digital assistant (PDA), smart phone, wearable device (e.g., smart watch, personal fitness device, personal safety device), or any programmable computer system known in the art with an interactive display. Client device 104 includes user interface 114 and may include a client based counterfeit detection program 112, not illustrated in FIG. 1. In general, client device 104 is representative of any programmable electronic device or combination of programmable electronic devices capable of executing machine-readable program instructions and communicating with users of other electronic devices via network 110. Client device 104 may include components, as depicted and described in further detail with respect to FIG. 4, in accordance with embodiments of the present invention.

In this embodiment, sentiment filter program 110 operates in a server-side based setting on server computer 102. In another embodiment, sentiment filter program 110 can operate in a client-side based setting, for example on client device 104. Sentiment filter program 110 has the ability to filter content 112 (e.g., user comments) on a webpage according to set parameters, where a user of client device 104 is accessing the webpage. Content 112 represents articles, blog posts, journals, comments, and discussions that populate webpages on a particular website. Sentiment filter program 110 has the ability to determine whether the user of client device 104 is accessing a webpage and determine whether a comment section is present on the webpage. In the event sentiment filter program 110 determines there is no comment section on the webpage, sentiment filter program 110 has the ability to identify words on the webpage that meet a sentiment threshold, determine a sentiment score, and display content 112 of the webpage according to identified parameters.

Alternatively, in the event sentiment filter program 110 determines there is a comment section on the webpage, sentiment filter program 110 has the ability to initialize a sentiment filter for the webpage being accessed based on a set of parameters. Sentiment filter program 110 has the ability to identify a word in each comment on the webpage and determine whether that word meets a sentiment threshold. Sentiment filter program 110 has the ability to flag the words in each comment that meet the sentiment threshold and determine an overall sentiment score for each comment. In the event the sentiment score for a comment exceeds a threshold, sentiment filter program 110 identifies parameters for displaying the comment and displays the comment according to the identified parameters.

Sentiment filter program 110 has the ability to operate in a setting where an administrative user may not have access to comments posted on a webpage of a website. In one example, an administrative user may not have access to a section dedicated to private messaging on a social media website, where a user has the ability to send a private message (i.e., comment) to other users on the social media website without the message being seen by the administrative user. Sentiment filter program 110 has the ability to determine a user is accessing a webpage of website that includes a section for private messaging and proceeds with managing the private messages sent and received by the user. In another example, an administrative user may not have access to a message sent between two or more users on a messaging based application for mobile devices. Sentiment filter program 110 has the ability to determine a user is accessing the messaging based application on client device 104 and proceeds with managing the messages (i.e., comments) sent between the two or more users on the messaging based application.

Client device 104 also includes user interface (UI) 114 and various programs (not shown). Examples of the various programs on client device 104 include: a web browser, an e-mail client, security software (e.g., a firewall program, a geo-locating program, an encryption program, etc.), an instant messaging (IM) application (app), and a communication (e.g., phone) application. In an example, a user of client device 104 can interact with user interface 114, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate user interface 114 operating within the GUI of client device 104. User interface 114 accepts input from a plurality of input/output (I/O) devices including, but not limited to, a tactile sensor interface (e.g., a touch screen, a touchpad) referred to as a multi-touch display. An I/O device interfacing with user interface 114 may be connected to client device 104, which may operate utilizing wired (e.g., USB port) or wireless network communications (e.g., infrared, NFC, etc.).

Storage 106 represents any type of storage device capable of storing data that is accessed and utilized by sentiment filter program 110. Storage 106 is accessible through network 108 by sentiment filter program 110 or a user of server computer 102 and client device 104. In other embodiments, storage 106 represents multiple storage devices, where data accessed and utilized by sentiment filter program 110 is stored across multiple platforms. Storage 106 stores information such as, but not limited to, user information, account information, location information, notification procedures, and notification procedure parameters. In an alternative embodiment, storage 106 can be located on server computer 102.

In general, network 108 can be any combination of connections and protocols that will support communications among server computer 102, client device 104, and storage 106. Network 110 can include, for example, a local area network (LAN), a wide area network (WAN), such as the internet, a cellular network, or any combination of the preceding, and can further include wired, wireless, and/or fiber optic connections. In one embodiment, sentiment filter program 110 can be a web service accessible via network 108 to a user of client device 104. In another embodiment, sentiment filter program 110 may be operated directly by a user of server computer 102.

Figure 2:
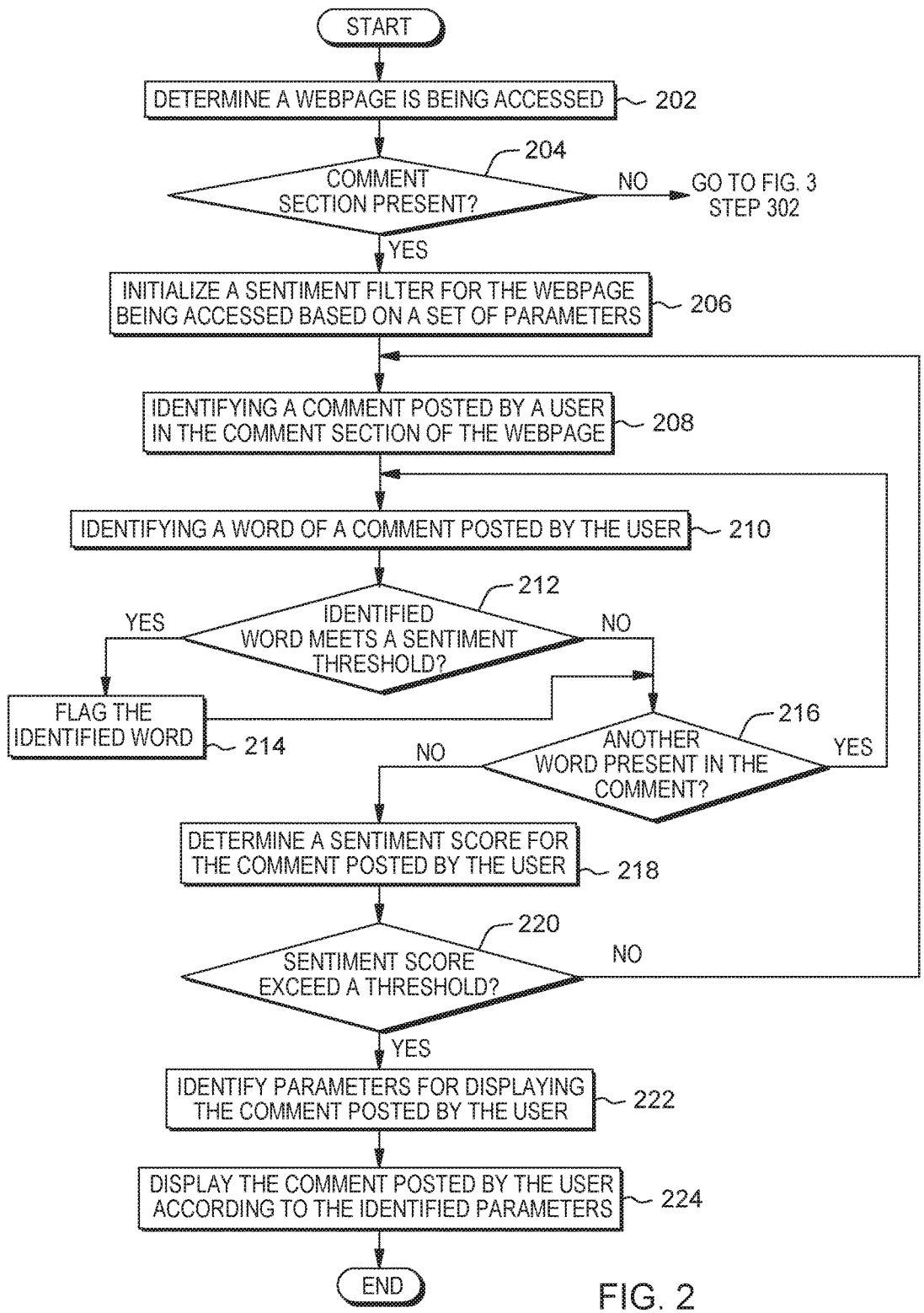
FIG. 2 is a flowchart depicting one embodiment of a sentiment filter program managing comments on a webpage based on a sentiment filter, in accordance with the present invention.

FIG. 2 is a flowchart depicting one embodiment of a sentiment filter program managing comments on a webpage based on a sentiment filter, in accordance with the present invention. As depicted, a method includes determining (202) a webpage is being accessed, determining (204) whether a comment section is present on the webpage being accessed, initializing (206) a sentiment filter for the webpage being accessed based on a set of parameters, identifying (208) a comment posted by a user in the comment section of the webpage, identifying (210) a word of a comment posted by the user, determining (212) whether the identified word meets a sentiment threshold, flagging (214) the identified word, determining (216) whether another word is present in the comment posted by the user, determining (218) a sentiment score for the comment posted by the user, determining (220) whether the sentiment score for the comment posted by the user exceeds a threshold value, identifying (222) parameters for displaying the comment posted by the user, and displaying (224) the comment posted by the user according to the identified parameters. In one embodiment, sentiment filter program 110 performs the above-mentioned steps of the method.

The method may commence by determining (202) a webpage is being accessed. In this embodiment, sentiment filter program 110 determines a user of client device 104 is accessing a webpage of a website that includes a form of online communication. An online communication can include a message or interaction that is provided by a user of the webpage, whether the user is an author of the content of the webpage or the user is participating in an online discussion. In an example, sentiment filter program 110 determines a user of client device 104 is accessing a webpage of a social media web site, where an online communication on the webpage includes a status update provided by another user. In another example, sentiment filter program 110 determines a user of client device 104 is accessing a webpage of a news outlet, where an online communication on the webpage includes an article. In yet another example, sentiment filter program 110 determines a user of client device 104 is accessing a webpage of a blogging website, where an online communication on the webpage includes a blog posted by another user.

The method may continue by determining (204) whether a comment section is present on the webpage being accessed. In the event a comment section is present on the webpage being accessed ("yes" branch, 204), sentiment filter program 110 initializes (206) a sentiment filter for the webpage being accessed based on a set of parameters. In the event a comment section is not present on the webpage being accessed, sentiment filer program 110 identifies (302) words that meet a sentiment threshold, which is discussed in further detail with regards to FIG. 3.

In this embodiment, a comment section represents a portion of the webpage where the user can view comments posted by other users of the webpage and participate in discussions with other users based on the content provided on the webpage. In one example, a user of client device 104 is accessing a webpage of a news outlet, where the webpage includes an article and a section for posting reactions (i.e., comments) to the article. Sentiment filter program 110 determines the webpage with the article supports posting reactions towards the article and determines that a comment section is present for the webpage being accessed by the user. In another example, a user of client device 104 is accessing a webpage of a social media website, where the webpage includes a group chat between multiple users. Sentiment filter program 110 determines the webpage with the group chat on the social media website allows for the user of client device 104 to participate in the group chat and determines that a comment section is present for the webpage being accessed by the user. In yet another example, a user of client device is accessing a webpage with a blog post, where a comment section for the blog post is disabled. Sentiment filter program 110 determines the webpages with the blog post does not include a section for entering comments and determines that a comment section is not present for the webpage being accessed by the user.

The method may continue by initializing (206) a sentiment filter for the webpage being accessed based on a set of parameters. In this embodiment, sentiment filter program 110 initializes the sentiment filter for the webpage based on a type of online communication present on the webpage being accessed by the user of client device 104. For example, a sentiment filter for a webpage with a public blog post can differ from a sentiment filter for a webpage with a private blog post, where the private blog post is visible by a select number of users. Based on the type of online communication present on the webpage, sentiment filter program 110 determines which sentiment filter to utilize for the webpage being accessed by the user of client device 104.

Sentiment filter program 110 initializes the sentiment filter by querying storage 106 for the set of parameters based on the type of online communication, receiving the set of parameters from storage 106, and applying the set of parameters to the sentiment filter. The set of parameters can include a list of words deemed as having positive or negative sentiment, where the list of words include tense variations for each word, commonly misspelled variations for each word, and abbreviation variations for each word. Alternatively, the set of parameters can include a list of words deemed as having positive sentiment, where the list of words include tense variations for each word, commonly misspelled variations for each word, and abbreviation variations for each word.

The method may continue by identifying (208) a comment posted by a user in the comment section of the webpage. In this embodiment, sentiment filter program 110 identifies a comment by identifying a layout for the webpage, where the layout includes sections of the webpage populated with alphabetical letters and numerical values. Each section populated with alphabetical and numerical values represents a comment posted to the webpages. Sentiment filter program 110 also identifies a user name associated with the identified section of the webpage, where the user name is a hyperlink to a profile webpage associated with the user name. In this embodiment, sentiment filter program 110 identifies a comment posted by a user in the comment section of the webpage, where the comment includes at least one alphabetical letter or numerical value in a section of a webpage and an identified user name associated with the comment. Alternatively, sentiment filter program 110 identifies a comment posted by a user in the comment section of the webpage, where the comment includes at least one alphabetical letter or numerical value in a section of a webpage. In another embodiment, sentiment filter program 110 operates on a single website, where sentiment filter program 110 includes user defined preferences for identifying comments specific to all the variation in layouts of webpages associated with a website. For example, a particular blogging website can utilize a similar layout across each webpage, where a top portion of a webpage includes a blog posted by a user and a bottom portion of a webpage includes a section for entering comments.

The method may continue by identifying (210) a word of a comment posted by the user. Sentiment filter program 110 utilizes an electronic dictionary for identifying a word of a comment posted by the user. Additionally, sentiment filter program 110 utilizes the sentiment filter, along with the set parameters that includes a list of variations for words that have positive and negative sentiment. In this embodiment, sentiment filter program 110 identifies a word of a comment, where the word includes numerical values to manipulate how the word is spelled. In an example, sentiment filter program 110 identifies a particular word of a comment even if the particular word utilizes the numerical value "0" instead of the alphabetical letter "O" or the numerical value "3" instead of the alphabetical letter "E". In another example, sentiment filter program 110 utilizes a sentiment filter, where sentiment filter program 110 can identify words with manipulation to the alphabetical letters of the word and match the manipulated word with a known word.

In another embodiment, sentiment filter program 110 identifies a word that is misspelled, whether the misspelling was intentional or unintentional. The set of parameters of the sentiment filter that sentiment filter program 110 initializes in step 206 includes a list of variations of words that are deemed to have positive and negative sentiment. Sentiment filter program 110 can query the list of variations for words that have negative and positive sentiment and determine whether the misspelled word is included in the list. In response to sentiment filter program 110 determining the misspelled word is present in the list of variations for the words, sentiment filter program 110 identifies the misspelled word by an originally intended word. Additionally, if the misspelled word was intentional and a word originally intended to have negative sentiment, sentiment filter program 110 utilizes a metadata tag to flag the identified word as being a potential word that was intentionally misspelled by the user to prevent a filter from hiding the word and comment posted by the user.

The method may continue by determining (212) whether the identified word meets a sentiment threshold. In the event the identified word does meet a sentiment threshold ("yes" branch, 212), sentiment filter program 110 flags (214) the identified word. In the event the identified word does not meet a sentiment threshold ("no" branch, 212), sentiment filter program 110 determines (216) whether another word is present in the comment posted by the user.

In this embodiment, sentiment filter program 110 utilizes a negative sentiment threshold, where a word that meets a negative sentiment threshold represents a word that is present in the list of variations for words that have a negative sentiment. Alternatively, sentiment filter program 110 can utilize a positive sentiment threshold, where a word that meets a positive sentiment threshold represents a word that is present in the list of variations for words that have a positive sentiment. In another embodiment, sentiment filter program 110 has the ability to determine whether the identified word meets a sentiment threshold based on parental control settings previous established on a web browser. The sentiment threshold can directly correlate to the parent control settings. For example, a safer browsing filter (i.e., high level) of the parental control settings lowers the threshold for which sentiment filter program 110 determines that an identified word meets a negative sentiment threshold.

The method may continue by flagging (214) the identified word. In this embodiment, sentiment filter program 110 determines the identified word has met a negative sentiment threshold and utilizing a metadata tag, flags the identified word as having negative sentiment. Sentiment filter program 110 has the ability to flag the identified word, while providing additional information on the identified word through the use of the metadata tag. In an example, sentiment filter program 110 identifies a word with negative sentiment that was intentionally misspelled utilizing numerical values instead of alphabetical letters in an attempt to pass the word through a negative comment filter. Sentiment filter program 110 flags the identified word and provides further information in the metadata tag that the user attempted to intentionally misspell the identified word that includes negative sentiment. In another example, sentiment filter program 110 identifies a word with negative sentiment that was spelled correctly and met a negative sentiment threshold. Sentiment filter program 110 flags the identified word and provides further information in the metadata tag that the user did not attempt to intentionally misspell the identified word that includes negative sentiment.

In another embodiment, sentiment filter program 110 sends a notification to the user of client device 104 when flagging the identified word that meets the negative sentiment threshold. Alternatively, sentiment filter program 110 can send a notification to another user (e.g., parent or guardian) associated with the user of client device 104 when flagging the identified word that meets the negative sentiment threshold. The notification sentiment filter program 110 informs the other user that the user of client device 104 has accessed a webpage that includes a comment with an identified word that meets the negative sentiment threshold. The notification can also inform the other user an extent to which the identified word exceeded the negative sentiment threshold. For example, sentiment filter program 110 can utilize a list of words, as part of the set of parameters of the sentiment filter, deemed to have negative sentiment according to three levels of severity (low, medium, and high).

The method may continue by determining (216) whether another word is present in the comment posted by the user. In the event another word is not present in the comment in the comment posted by the user ("no" branch, 216), sentiment filter program 110 determines (218) a sentiment score for the comment posted by the user. In the event another word is present in the comment in the comment section of the webpage ("yes" branch, 218), sentiment filter program 110 reverts back to identifying (210) a word of a comment posted by the user.

The method may continue by determining (218) a sentiment score for the comment posted by the user. In this embodiment, sentiment filter program 110 determines an overall sentiment score for the comment posted by the user. The sentiment score is dependent on the number of identified words in the comment that exceed the sentiment threshold and an extent to which each of the identified words in the comment exceed the sentiment threshold. Sentiment filter program 110 can utilize an adjusted user defined scale, where a first portion of the sentiment score is dependent on a number of identified words in the comment that exceed the sentiment threshold and a second portion is the sentiment score is dependent on an extent to which each of the identified words in the comment exceed the sentiment threshold. Alternative to a number of identified words in the comment that exceed the sentiment threshold, sentiment filter program 110 can determine a portion of the comment that includes words that meet a negative sentiment threshold. For example, sentiment filter program 110 utilizes the sentiment threshold to determine that 4 out of 20 (i.e., 20%) in the comment posted by the user meet the negative sentiment threshold. Sentiment filter program 110 scales the percentage (i.e., 20%) according to the first portion of the sentiment score and applies the scaled first portion of the sentiment score to the total overall sentiment score.

The second portion of the sentiment score includes a scaled measure of an extent to which each of the identified words in the comment exceeds the sentiment threshold. In one embodiment, sentiment filter program 110 can query the set of parameters of the sentiment filter to determine a level of negative sentiment an identified word has. As previously mentioned, sentiment filter program 110 can utilize a list of words deemed to have negative sentiment according to three levels of severity (low, medium, and high). Sentiment filter program 110 can assign a score of 1 for an identified word that has a low level of negative sentiment and a score of 3 for an identified word that has a high level of negative sentiment. Sentiment filter program 110 combines the assigned scores for the identified words that meet the negative sentiment threshold, scales the combined score for the identified words that meet the negative sentiment threshold according to the second portion of the sentiment score, and applies the scaled second portion of the sentiment score to the total overall sentiment score. Subsequently, sentiment filter program 110 combines (i.e., sums) the first portion and the second portion of the sentiment score to obtain the total overall sentiment score for the comment posted by the user.

In another embodiment, sentiment filter program 110 utilizes a third portion to obtain a total overall sentiment score for the comment posted by the user. Sentiment filter program 110 determines whether the metadata information includes a tag to flag the identified word as being a potential word that was intentionally misspelled by the user to prevent a filter from hiding the word and comment posted by the user. Sentiment filter program 110 can assign a higher value (e.g., 2) to the identified word that was intentionally misspelled by the user to prevent a filter from hiding the word and comment posted by the user and a lower value (e.g., 1) to the identified word that was not intentionally misspelled by the user. Sentiment filter program 110 combines the assigned values for the identified words, scales the combined score for the identified words according to the third portion of the sentiment score, and applies the scaled third portion of the sentiment score to the total overall sentiment score. Subsequently, sentiments filter program 110 combines (i.e., sums) the first portion, the second portion, and the third portion of the sentiment score to obtain the total overall sentiment score for the comment posted by the user.

The method may continue by determining (220) whether the sentiment score for the comment posted by the user exceeds a threshold value. In the event the sentiment score for the comment posted by the user exceeds a threshold value ("yes" branch, 220), sentiment filter program 110 identifies (222) parameters for displaying the comment posted by the user. In the event the sentiment score for the comment posted by the user does not exceed a threshold value ("no" branch, 220), sentiment filter program 110 reverts back to identifying (208) a comment posted by a user in the comment section of the webpage.

In this embodiment, sentiment filter program 110 determines that the sentiment score of the comment posted by the user exceeds the negative sentiment threshold. Sentiment filter program 110 tracks the number of comments a particular user posts, where each comment has a sentiment score that exceeds the negative sentiment threshold. Sentiment filter program 110 can disable an account associated with the particular user if a pre-determined number of comments is reached that include a sentiment score that exceed the negative sentiment threshold. Alternatively, sentiment filter program 110 can disable an account associated with the particular user if a percentage of total comments the particular user posts are determined to have a sentiment score that exceeds the negative sentiment threshold. For example, sentiment filter program 110 can disable an account associated with the particular user if the particular user posts comments that exceed the negative sentiment threshold more than 10 percent of the time.

The method may continue by identifying (222) parameters for displaying the comment posted by the user. In this embodiment, sentiment filter program 110 utilizes user-defined parameters for displaying a comment by a user that exceeds a negative sentiment score threshold. In one example, sentiment filter program 110 can include parameters for displaying the comment that exceeds a negative sentiment threshold, where the parameters can alter a font, a color of font, a font style, a background style, and a background color of the comment. In another example, sentiment filter program 110 can include parameters for displaying the comment that exceeds a negative sentiment threshold that includes displaying a unique icon next to the comment, where the unique icon signals negative sentiment. In yet another example, sentiment filter program 110 can include parameters for displaying the comment that exceeds a negative sentiment threshold that obfuscates the comment or obfuscates the identified words that meet the negative sentiment threshold.

The method may continue by displaying (224) the comment posted by the user according to the identified parameters. In this embodiment, sentiment filter program 110 displays the comment posted by the user in user interface 114 on client device 104. In addition to displaying the comment posted by the user according to the identified parameters, sentiment filter program 110 has the ability to show the overall negative sentiment score for the comment. Sentiment filter program 110 can display an average for all the overall negative sentiment scores for the comments on the webpage being accessed by the user of client device 104. In another embodiment, sentiment filter program 110 displays comments posted by the user according to the identified parameters in a ranked order based on the determined sentiment score for each comment posted by the user. In yet another embodiment, sentiment filter program 110 displays a warning prior to displaying the comment posted by the user, where the warning specifies that the comment includes a sentiment score that exceeds a threshold.

Sentiment filter program 110 can send a notification to another user (e.g., parent or guardian) associated with the user of client device 104 when displaying comments posted by users according to the identified parameters. The notification can alert the other user that the user of client device 104 is viewing a webpage that includes comments that meet a negative sentiment threshold. Sentiment filter program 110 can send a notification to another user when a webpage exceeds a pre-determined number of comments that meet the negative sentiment threshold or when an average for all the overall negative sentiment scores exceeds a pre-determined score. Sentiment filter program 110 can also compare login history for the user of client device 104 and time spent viewing the webpage to determine a correlation between the user of client device 104 and the content of the webpage. Additionally, sentiment filter program 110 can send a notification that includes a suggestion to not participate in a discussion on the webpage if sentiment filter program 110 identifies that an average for all the overall negative sentiment scores exceeds a pre-determined level.

Figure 3:
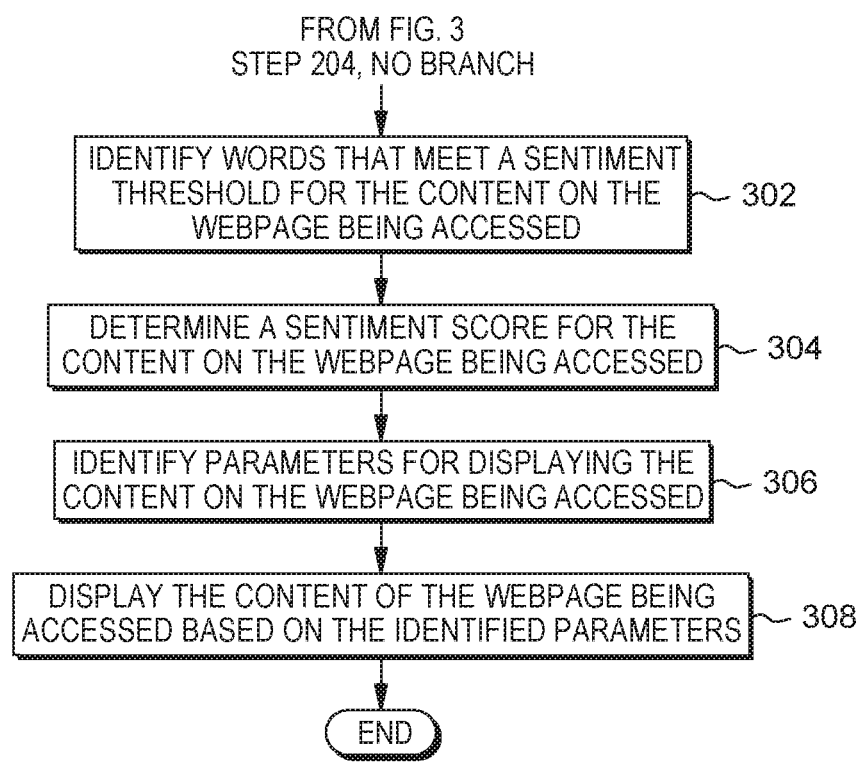
FIG. 3 is a flowchart depicting one embodiment of a sentiment filter program managing content on a webpage, in accordance with the present invention.

FIG. 3 is a flowchart depicting one embodiment of a sentiment filter program managing content on a webpage, in accordance with the present invention. As depicted, a method includes identifying (302) words that meet a sentiment threshold for the content on the webpage being accessed, determining (304) a sentiment score for the content on the webpage being accessed, identifying (306) parameters for displaying the content on the webpage being accessed, and displaying (308) the content of the webpage being accessed based on the identified parameters. In one embodiment, sentiment filter program 110 performs the above-mentioned steps of the method.

The method may commence by identifying (302) words that meet a sentiment threshold for the content on the webpage being accessed. In this embodiment, sentiment filter program 110 utilizes an electronic dictionary for identifying words that meet a negative sentiment threshold. Additionally, sentiment filter program 110 utilizes a list of variations for words that have negative sentiment. For example, sentiment filter program 110 can identify a word in the content of the webpage, where the word includes numerical values to manipulate how the word is spelled. In an example, sentiment filter program 110 identifies a particular word in the content of the webpage even if the particular word utilizes the numerical value "0" instead of the alphabetical letter "O" or the numerical value "3" instead of the alphabetical letter "E". In another example, sentiment filter program 110 Sentiment filter program 110 identifies the words with manipulation to the alphabetical letters of the word and matches the manipulated word with a known word.

In another embodiment, sentiment filter program 110 identifies a word that is misspelled, whether the misspelling was intentional or unintentional. Sentiment filter program 110 can determine whether the misspelled word is included in a pre-determined list of misspelled words that have negative sentiment. In response to sentiment filter program 110 determining the misspelled word is present in the list of variations for the words, sentiment filter program 110 identifies the misspelled word by an originally intended word. Additionally, if the misspelled word was intentional and a word originally intended to have negative sentiment, sentiment filter program 110 utilizes a metadata tag to flag the identified word as being a potential word that was intentionally misspelled by the user to prevent a filter from hiding the word and comment posted by the user.

The method may continue by determining (304) a sentiment score for the content on the webpage being accessed. In this embodiment, the sentiment score is dependent on the number of identified words in the content of the webpage that meet the sentiment threshold and an extent to which each of the identified words in the content of the webpage exceed the sentiment threshold. Sentiment filter program 110 can utilize an adjusted user defined scale, where a first portion of the sentiment score is dependent on a number of identified words in the content of the webpage that exceed the sentiment threshold and a second portion of the sentiment score is dependent on an extent to which each of the identified words in the content of the webpage exceed the sentiment threshold. Alternative to a number of identified words in the content of the webpage that exceed the sentiment threshold, sentiment filter program 110 can determine a portion of the content of the webpage that include words that meet a negative sentiment threshold. For example, sentiment filter program 110 utilizes the sentiment threshold to determine that 35 out of 250 (i.e., 14%) words in the content of the webpage posted by user meet the negative sentiment threshold. Sentiment filter program 110 scales the percentage (i.e., 14%) according to the first portion of the sentiment score and applies the scaled first portion of the sentiment score to the total overall sentiment score.

The second portion of the sentiment score includes a scaled measure of an extent to which each of the identified words in the content of the webpage exceeds the sentiment threshold. In one embodiment, sentiment filter program 110 can determine a level of negative sentiment of an identified word. As previously in discussed in regard to FIG. 2, sentiment filter program 110 can utilize a list of words deemed to have negative sentiment according to three levels of severity (low, medium, and high). Sentiment filter program 110 can assign a score of 1 for an identified word that has a low level of negative sentiment and a score of 3 for an identified word that has a high level of negative sentiment. Sentiment filter program 110 combines the assigned scores for the identified words that meet the negative sentiment threshold, scales the combined score for the identified words that meet the negative sentiment threshold according to the second portion of the sentiment score, and applies the scaled second portion of the sentiment score to the total overall sentiment score. Subsequently, sentiment filter program 110 combines (i.e., sums) the first portion and the second portion of the sentiment score to obtain the total overall sentiment score for the content of the webpage.

In another embodiment, sentiment filter program 110 utilizes a third portion to obtain a total overall sentiment score for the content of the webpage. Sentiment filter program 110 determines whether the metadata information includes a tag to flag the identified word as being a potential word that was intentionally misspelled by the user to prevent a filter from hiding the word and comment posted by the user. Sentiment filter program 110 can assign a higher value (e.g., 2) to the identified word that was intentionally misspelled by the user to prevent a filter from hiding the word posted by the user and a lower value (e.g., 1) to the identified word that was not intentionally misspelled by the user. Sentiment filter program 110 combines the assigned values for the identified words, scales the combined score for the identified words according to the third portion of the sentiment score, and applies the scaled third portion of the sentiment score to the total overall sentiment score. Subsequently, sentiments filter program 110 combines (i.e., sums) the first portion, the second portion, and the third portion of the sentiment score to obtain the total overall sentiment score for the comment posted by the user.

The method may continue by identifying (306) parameters for displaying the content on the webpage being accessed. In this embodiment, sentiment filter program 110 utilizes user-defined parameters for displaying the content of the webpage that exceeds a negative sentiment score threshold. In one example, sentiment filter program 110 can include parameters for displaying the identified words that exceeds a negative sentiment threshold, where the parameters can alter a font, a color of font, a font style, a background style, and a background color of the word. In another example, sentiment filter program 110 can include parameters for displaying the identified words that exceed a negative sentiment threshold that include displaying a unique icon next to each word, where the unique icon signals negative sentiment. In yet another example, sentiment filter program 110 can include parameters for displaying the words that exceed a negative sentiment threshold that obfuscates the identified words that meet the negative sentiment threshold.

The method may continue by displaying (308) the content of the webpage being accessed based on the identified parameters. In this embodiment, sentiment filter program 110 displays the content of the webpage in user interface 114 on client device 104. In addition to displaying the content of the webpage according to the identified parameters, sentiment filter program 110 has the ability to show the overall negative sentiment score for the content of the webpage.

Figure 4:
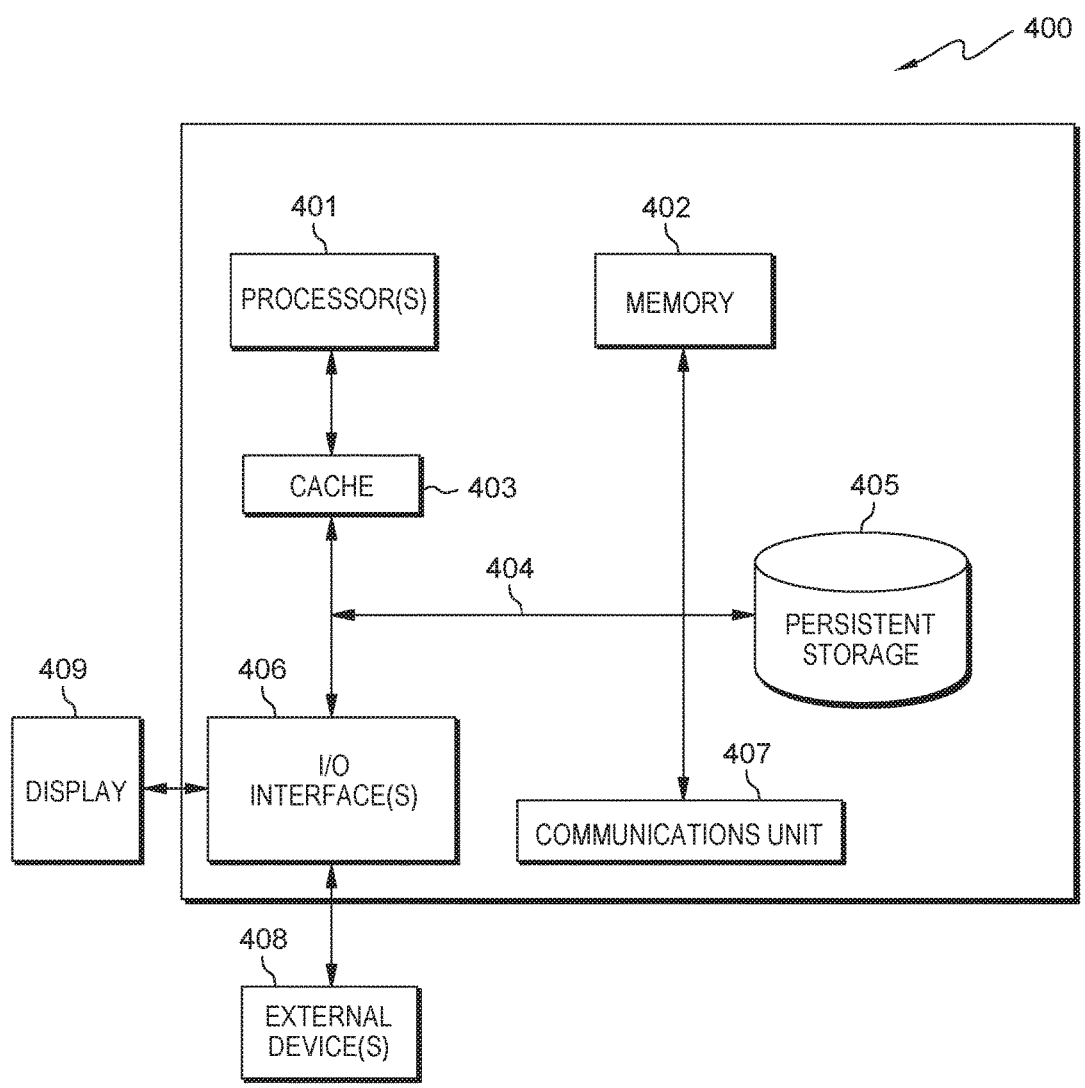
FIG. 4 is a block diagram of components of a computer system, such as the computer server of FIG. 1, in an embodiment in accordance with the present invention.

FIG. 4 depicts computer system 400, where server computer 102 represents an example of a system that includes sentiment filter program 110. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining, by one or more processors, content is being accessed, wherein the content includes a first message posted by a first user out of a plurality of messages posted by a plurality of users in a platform for communication between the plurality of users;
   initializing, by one or more processors, a sentiment filter for the content based on a set of parameters;
   responsive to identifying a first word of the first message, determining, by one or more processors, whether the first word of the first message exceeds a first negative sentiment threshold, wherein exceeding the first negative sentiment includes the first word matching a previously identified word with a high level of negative sentiment severity and the first word matching an intentional misspelling of the first word;
   responsive to determining the first word of the first message exceeds the first negative sentiment threshold, identifying, by one or more processors, one or more parameters for displaying the first message posted by the first user, wherein the one or more parameters alter how the first word and the first message are displayed with respect to the exceeding of the first negative sentiment threshold;
   displaying, by one or more processors, the first message posted by the first user according to the identified one or more parameters; and
   responsive to determining an average score for the plurality of messages of the content exceeds a second negative sentiment threshold, sending, by one or more processors, a notification that includes a suggestion to not participate in a discussion related to the content exceeding the second negative sentiment threshold on the platform for communication between the plurality of users.

2. The method of claim 1, further comprising:
   flagging, by one or more processors, the first message posted by the first user; and
   determining, by one or more processors, whether the first message exceeds a sentiment score threshold, wherein the sentiment score threshold is based on a number of identified words in the first message that exceed the first negative sentiment threshold.

3. The method of claim 2, wherein the sentiment score threshold is further based on a level of severity of an identified word in the first message.

4. The method of claim 1, further comprising:
   sending, by one or more processors, a notification to a second user associated with the first user, wherein the notification includes the first word of the first message and the first message posted by the first user that exceeds the sentiment threshold.

5. The method of claim 1, wherein the set of parameters includes variations to particular words, wherein the variations includes replacing alphabetical letters with numerical values.

6. The method of claim 1, wherein the platform for communication between a plurality of users includes at least one private message between the first user and at least one of the plurality of users on a social media website.

7. The method of claim 1, wherein the platform for communication between a plurality of users includes at least one private message between the first user and at least one of the plurality of users on a messaging based application for mobile devices.

8. A computer program product comprising:
   one or more computer readable tangible storage media and program instructions stored on at least one of the one or more storage media, the program instructions comprising:
   program instructions to determine content is being accessed, wherein the content includes a first message posted by a first user out of a plurality of messages posted by a plurality of users in a platform for communication between the plurality of users;
   program instructions to initialize a sentiment filter for the content based on a set of parameters;
   program instructions to, responsive to identifying a first word of the first message, determine whether the first word of the first message exceeds a first negative sentiment threshold, wherein exceeding the first negative sentiment includes the first word matching a previously identified word with a high level of negative sentiment severity and the first word matching an intentional misspelling of the first word;
   program instructions to, responsive to determining the first word of the first message exceeds the negative sentiment threshold, identify one or more parameters for displaying the first message posted by the first user, wherein the one or more parameters alter how the first word and the first message are displayed with respect to the exceeding of the negative sentiment threshold;
   program instructions to display the first message posted by the first user according to the identified one or more parameters; and
   responsive to determining an average score for the plurality of messages of the content exceeds a second negative sentiment threshold, program instructions to send a notification that includes a suggestion to not participate in a discussion related to the content exceeding the second negative sentiment threshold on the platform for communication between the plurality of users.

9. The computer program product of claim 8, further comprising program instructions, stored on the one or more computer readable storage media, which when executed by a processor, cause the processor to:
   flag the first message posted by the first user; and
   determine whether the first message exceeds a sentiment score threshold, wherein the sentiment score threshold is based on a number of identified words in the first message that exceed the first negative sentiment threshold.

10. The computer program product of claim 9, wherein the sentiment score threshold is further based on a level of severity of an identified word in the message.

11. The computer program product of claim 8, further comprising program instructions, stored on the one or more computer readable storage media, which when executed by a processor, cause the processor to:
send a notification to a second user associated with the first user, wherein the notification includes the first word of the first message and the first message posted by the first user that exceeds the sentiment threshold.

12. The computer program product of claim 8, wherein the set of parameters includes variations to particular words, wherein the variations includes replacing alphabetical letters with numerical values.

13. The computer program product of claim 8, wherein the platform for communication between a plurality of users includes at least one private message between the first user and at least one of the plurality of users on a social media website.

14. The computer program product of claim 8, wherein the platform for communication between a plurality of users includes at least one private message between the first user and at least one of the plurality of users on a messaging based application for mobile devices.

15. A computer system comprising:
one or more computer processors;
one or more computer readable storage media; and
program instructions stored on the computer readable storage media for execution by at least one of the one or more computer processors, the program instructions comprising:
program instructions to determine content is being accessed, wherein the content includes a first message posted by a first user out of a plurality of messages posted by a plurality of users in a platform for communication between the plurality of users;
program instructions to initialize a sentiment filter for the content based on a set of parameters;
program instructions to, responsive to identifying a first word of the first message, determine whether the first word of the first message exceeds a first negative sentiment threshold, wherein exceeding the first negative sentiment includes the first word matching a previously identified word with a high level of negative sentiment severity and the first word matching an intentional misspelling of the first word;
program instructions to, responsive to determining the first word of the first message exceeds the negative sentiment threshold, identify one or more parameters for displaying the first message posted by the first user, wherein the one or more parameters alter how the first word and the first message are displayed with respect to the exceeding of the negative sentiment threshold;
program instructions to display the first message posted by the first user according to the identified one or more parameters; and
responsive to determining an average score for the plurality of messages of the content exceeds a second negative sentiment threshold, program instructions to send a notification that includes a suggestion to not participate in a discussion related to the content exceeding the second negative sentiment threshold on the platform for communication between the plurality of users.

16. The computer system of claim 15, further comprising program instructions, stored on the one or more computer readable storage media, which when executed by a processor, cause the processor to:
send a notification to a second user associated with the first user, wherein the notification includes the first word of the first message and the first message posted by the first user that exceeds the sentiment threshold.

17. The computer system of claim 15, wherein the platform for communication between a plurality of users includes at least one private message between the first user and at least one of the plurality of users on a social media website.

18. The computer system of claim 15, wherein the platform for communication between a plurality of users includes at least one private message between the first user and at least one of the plurality of users on a messaging based application for mobile devices.

* * * * *